(12) United States Patent
Horii et al.

(10) Patent No.: US 7,699,127 B2
(45) Date of Patent: Apr. 20, 2010

(54) HYDROGEN FILL INLET STRUCTURE FOR FUEL CELL VEHICLE

(75) Inventors: Yoshiyuki Horii, Saitama (JP); Junya Watanabe, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 632 days.

(21) Appl. No.: 11/201,304

(22) Filed: Aug. 11, 2005

(65) Prior Publication Data
US 2006/0040161 A1 Feb. 23, 2006

(30) Foreign Application Priority Data
Aug. 19, 2004 (JP) ............................. 2004-239773

(51) Int. Cl.
*B60K 1/00* (2006.01)
(52) U.S. Cl. .................... 180/65.1; 180/65.24; 280/834
(58) Field of Classification Search ................ 180/65.1, 180/65.2, 65.3, 220, 65.8, 65.24, 65.21; 903/903, 903/908; 165/104.12, 10; 137/312, 351, 137/581, 587; 280/834, 835
See application file for complete search history.

(56) References Cited

U.S. PATENT DOCUMENTS

| 5,701,928 | A  | * | 12/1997 | Aoki ............................ 137/312 |
| 6,326,765 | B1 | * | 12/2001 | Hughes et al. ............... 320/104 |
| 6,557,596 | B2 | * | 5/2003  | Ono et al. .................... 137/312 |
| 6,564,833 | B2 | * | 5/2003  | Ono et al. .................... 137/587 |
| 6,568,496 | B1 | * | 5/2003  | Huang ......................... 180/220 |
| 6,722,460 | B2 | * | 4/2004  | Yang et al. ................... 180/220 |
| 6,782,914 | B2 | * | 8/2004  | Kami et al. .................. 137/312 |
| 6,823,931 | B1 | * | 11/2004 | Stetson et al. ........... 165/104.12 |
| 7,121,366 | B2 | * | 10/2006 | Horii .......................... 180/65.1 |
| 7,234,551 | B2 | * | 6/2007  | Horii .......................... 180/65.1 |
| 2002/0162693 | A1 | * | 11/2002 | Mizuno et al. .............. 180/65.1 |

FOREIGN PATENT DOCUMENTS

| DE | 102 05 272 A1 | 8/2003 |
| EP | 1291947 A1 | 3/2003 |
| JP | 2001-130468 A | 5/2001 |
| JP | 2001-313056 A | 11/2001 |
| JP | 2002-166731 A | 6/2002 |
| JP | 2003-285655 A | 10/2003 |

* cited by examiner

Primary Examiner—Hau V Phan
(74) Attorney, Agent, or Firm—Birch, Stewart, Kolasch & Birch, LLP (57) ABSTRACT

A hydrogen fill inlet structure for a fuel cell vehicle includes a hydrogen cylinder for filling hydrogen gas from a hydrogen fill inlet. A fuel cell is provided for generating electrical power utilizing hydrogen gas supplied from the hydrogen cylinder. A motor is provided for generating propulsive power for supply to a drive wheel based on electrical power generated from the fuel cell. The hydrogen fill inlet is separate from a source port of the hydrogen cylinder, and is installed in the vicinity of the source port. The hydrogen fill inlet structure may be installed within the diameter of the hydrogen cylinder as viewed axially along the tank. In addition, a cover member is provided for covering the hydrogen cylinder. A lid is installed on a section in proximity to the source port and hydrogen fill inlet of the cover member.

20 Claims, 6 Drawing Sheets

HYDROGEN FILL INLET STRUCTURE FOR FUEL CELL VEHICLE

CROSS-REFERENCE TO RELATED APPLICATIONS

The present non-provisional application claims priority under 35 USC 119 to Japanese Patent Application No. 2004-239773 filed on Aug. 19, 2004 the entire contents thereof is hereby incorporated by reference.

BACKGROUND OF THE INVENTION

1. Field of the Invention

The present invention relates to a structure for a hydrogen fill inlet utilized in fuel cell vehicles for filling hydrogen gas into a hydrogen cylinder.

2. Description of Background Art

In fuel cell vehicles of the conventional art that are propelled by a vehicular drive motor from electrical power supplied from a fuel cell, when mounting what are generally multiple cylindrical hydrogen cylinders in the vehicle, the hydrogen cylinders were in most cases mounted longitudinally towards the front and rear of the vehicle in order to prevent making the vehicle width larger. See, for example, JP-A No. 313056/2002.

The structure of these hydrogen cylinders, that include high-pressure tanks, and preferably include a hydrogen fill inlet for the hydrogen cylinders that is installed after considering the peripheral piping layout and the hydrogen gas filling operation.

SUMMARY AND OBJECTS OF THE INVENTION

It is an object of an embodiment of the present invention to provide a hydrogen fill structure capable of making the hydrogen gas filling operation and hydrogen cylinder peripheral pipe layout easier in fuel cell vehicles containing hydrogen cylinders for supplying hydrogen gas to a fuel cell.

An embodiment of the present invention provides a hydrogen fill structure for fuel cell vehicles including a hydrogen cylinder 52 for filling hydrogen gas from a hydrogen fill inlet 72 and a fuel cell 51 for generating electrical power based on hydrogen gas supplied from the hydrogen cylinder. A motor 31 is provided for generating propulsive power for supply to a drive wheel 32 based on electrical power generated from the fuel cell. The hydrogen fill inlet is separate from the source port 71 for the hydrogen cylinder, and is also installed near the source port.

This structure allows shortening the gas pipe installed between the hydrogen fill inlet and the source port. The check and operating of the source port can easily be performed at the same time during the hydrogen gas filling. Moreover, the hydrogen fill inlet and the lid for the source port can be jointly used as one item.

An embodiment of the present invention includes a hydrogen fill inlet that is installed within the diameter of the hydrogen cylinder as viewed along its axis.

In hydrogen cylinders generally formed with the tip becoming narrower, this structure effectively utilizes the empty space formed at the tip near the source port as a space for installing the hydrogen fill inlet. Moreover, the distance between the hydrogen fill inlet and the source port, and therefore the length of the gas pipe between them can be further shortened.

An embodiment of the present invention includes a cover member 42 for covering the hydrogen cylinder wherein a lid 44 is formed on the section in proximity to the hydrogen fill inlet and the source port of the cover member.

The cover member of this structure therefore protects the hydrogen cylinder, and covers the source port and hydrogen fill inlet with the lid during normal driving. The lid is opened only during filling with hydrogen gas to expose the source port and the inlet fill port to the external portion of the cover member.

An embodiment of the present invention provides a hydrogen fill inlet that is installed at the rear end of the vehicle and above the rear wheel 32. This structure allows the worker to easily access the hydrogen flow inlet during filling of the hydrogen gas. Moreover, the hydrogen flow inlet can be installed at an appropriate height to make the task even easier to perform.

An embodiment of the present invention provides a hydrogen fill inlet that is installed in the vicinity of the vehicle tail lamp 43. This structure eliminates the need for newly installing a frame cover due to the effects on air resistance, when for example the hydrogen fill inlet was installed on the side of the vehicle. Thus, already existing vehicle frame components can therefore be utilized.

According to an embodiment of the present invention an easy layout of the pipe in the vicinity of the hydrogen fill inlet is allowed while simplifying the task of filling the hydrogen gas. Moreover, one lid can be jointly used (with the hydrogen fill inlet) so that the costs can be reduced and there is a greater freedom in design. The present invention allows for the installing of the hydrogen fill inlet so as to effectively utilize the empty space at the tip of the hydrogen cylinder, and makes the layout of pipe around the hydrogen fill inlet even easier.

An embodiment of the present invention allows for improving the hydrogen gas tank protection and makes for an easier filling of the hydrogen gas.

An embodiment of the present invention permits the filling of the hydrogen gas to be even easier by optimizing the layout of the hydrogen fill inlet.

An embodiment of the present invention makes the frame design simpler by utilizing preexisting frame components to lower the cost of construction.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Referring to the drawings, an embodiment of the invention will be described below. A direction such as forward, rearward, rightward and leftward in the following description shall be the same as a direction in a vehicle unless special description is made. An arrow FR in the drawing indicates the front of the vehicle, an arrow LH indicates the left of the vehicle, and an arrow UP indicates the upside of the vehicle.

Figure 1:
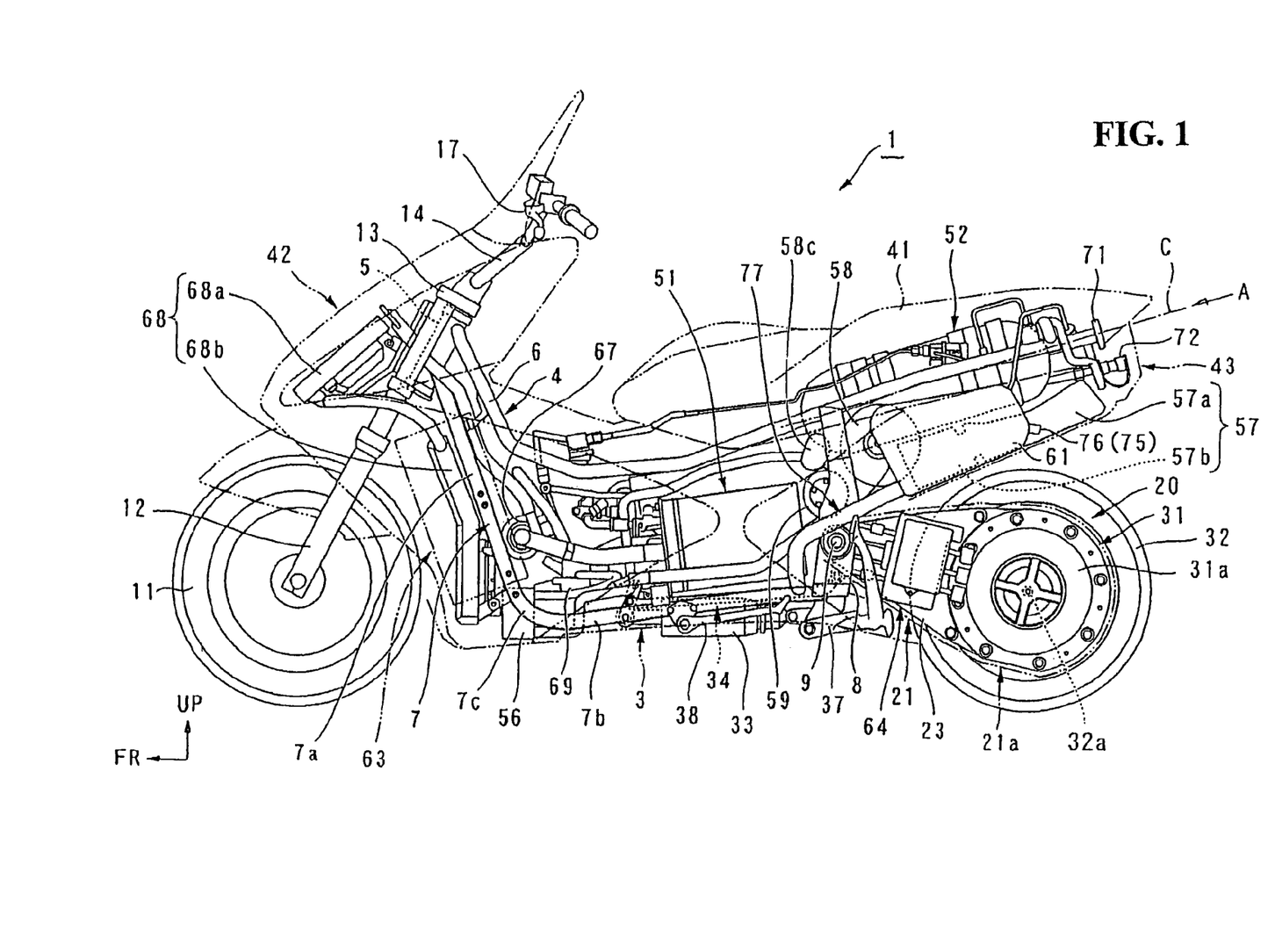
FIG. 1 is a left side view showing a fuel cell electric vehicle (a motorcycle) equivalent to an embodiment of the invention.
Figure 2:
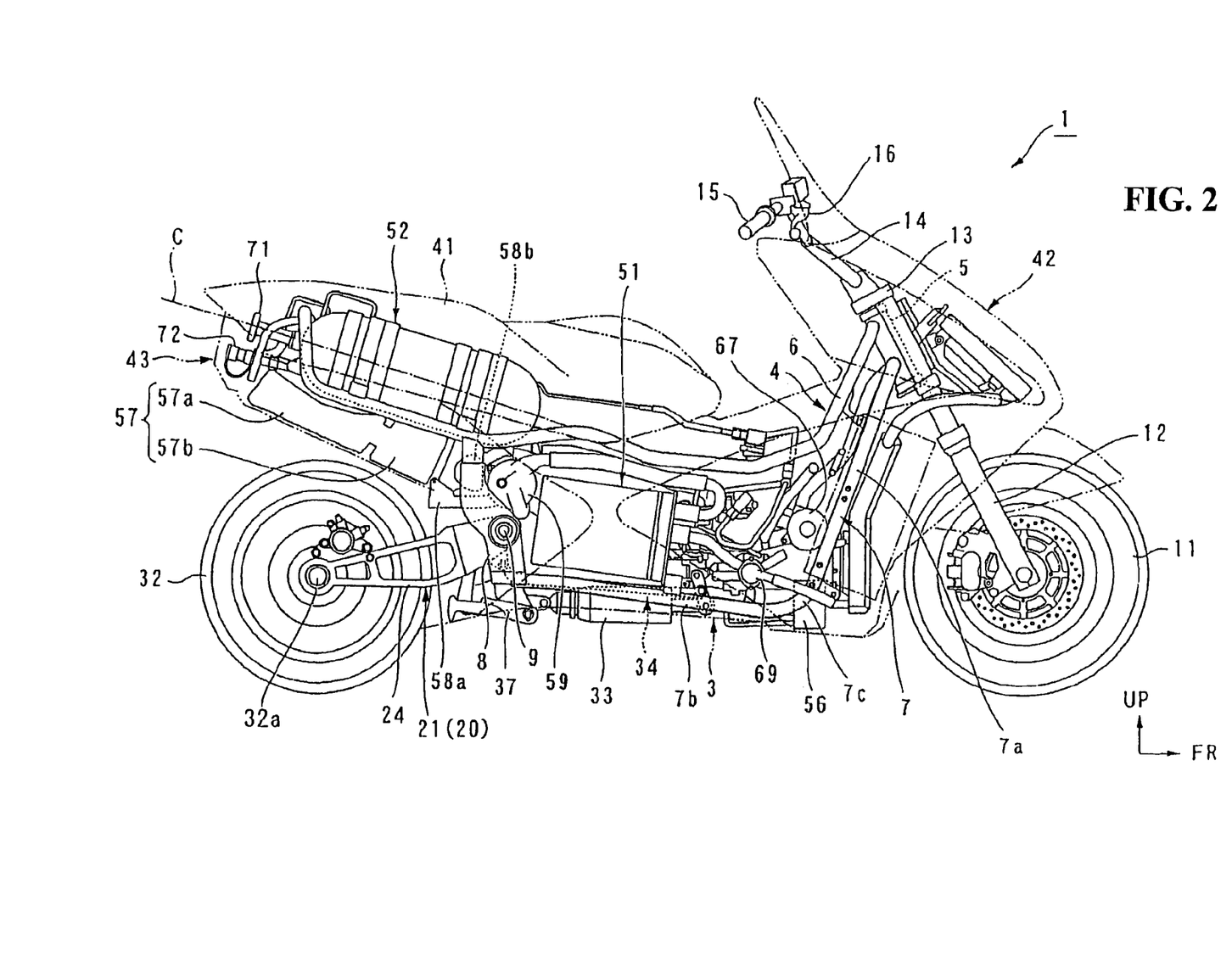
FIG. 2 is a right side view showing the fuel cell electric vehicle.
Figure 3:
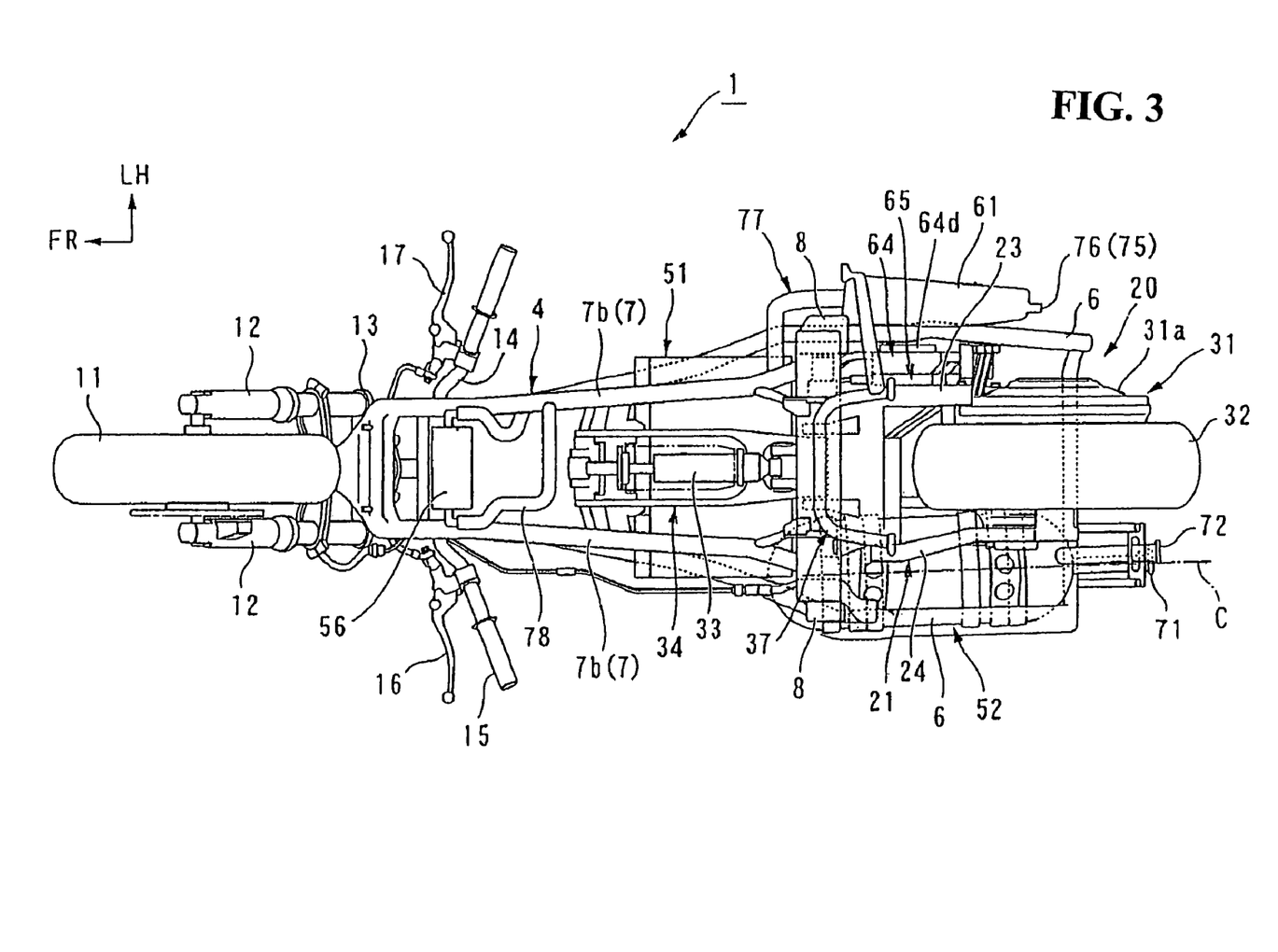
FIG. 3 is a bottom view showing the fuel cell electric vehicle.

A motorcycle 1 shown in FIGS. 1 to 3 is a fuel cell electric vehicle operated by driving a motor 31 for propelling the vehicle based upon electric power supplied from a fuel cell 51 mounted substantially in the center of the body. The motorcycle 1 may be a scooter-type vehicle provided with a low deck floor part (hereinafter merely called a floor part) 3, the rectangular parallelepipedic fuel cell 51 is arranged in the vicinity of the floor part 3, and the motor 31, in this embodiment a wheel-in motor, is arranged inside a rear wheel 32 which is a driving wheel of the motorcycle 1. The motor 31 is provided with the body of the motor and a deceleration mechanism in a casing 31a, is formed as an integrated unit, and is attached in the wheel from the left side for example in a state in which its output shaft is arranged coaxially with an axle 32a of the rear wheel.

A front wheel 11 of the motorcycle 1 is supported by the lower ends of a pair of right and left front forks 12 and the upside of each front fork 12 is supported by a head pipe 5 at the front end of a body frame 4 via a steering stem 13 so that the front fork can be steered. A handlebar 14 is attached to the upper end of the steering stem 13, a throttle grip 15 is arranged on a right grip of the handlebar 14, and a rear brake lever 16 and a front brake lever 17 are arranged in front of the left and right grips.

A pivot plate 8 extends in a vertical direction of the body and is provided to the rear of the body frame 4 and the front end of a rear swing arm 21 is supported via a pivot 9 by a slightly lower part of an intermediate part of the pivot plate 8 so that the side of the rear end can be vertically rocked. A left arm body 23 of the rear swing arm 21 extends up to the front end of the motor 31 and supports the casing 31a of the motor 31, while a right arm body 24 extends up to a center position of the rear wheel 32 and supports the axle 32a of the rear wheel. A motor unit 20 is provided as a swing unit of the motorcycle 1 (in other words, a rear frame for supporting the rear wheel 32 so that the rear wheel can be rocked) that is formed mainly by the above-mentioned rear swing arm 21 and the motor 31. As can be seen in FIGS. 1-3, hydrogen cylinder 52 extends in a direction that is perpendicular to an axle 32a of the drive wheel 32, and the hydrogen fill inlet 72 and the source port 71 project in a direction rearwardly and away from a rear end of the hydrogen cylinder 52.

A rear shock absorber 33 extends longitudinally and is arranged below the body frame 4 and under the fuel cell 51. The rear end of the rear shock absorber 33 is coupled to a lower part of the body frame 4 and the front end of the rear shock absorber 33 is coupled to a lower part of the motor unit 20 (the rear swing arm 21) via a link mechanism 34. The link mechanism 34 strokes the rear shock absorber 33 longitudinally according to the vertical rocking of the motor unit 20 so that shock and vibration input to the motor unit 20 are absorbed by the stroke of the rear shock absorber 33.

The body frame 4 is provided with an upper tube 6 branched toward the right and the left from an upper part of the head pipe 5, that extends diagonally rearwardly and downwardly and extends rearwardly after being bent in height equivalent to substantially a middle portion in a vertical direction of the body. A down tube 7 is branched toward the right and the left from a lower part of the head pipe 5, extends diagonally rearwardly and downwardly and extends rearwardly after being bent at the lower end of the body. The rear end of each of the upper tube 6 and the rear end of the down tube 7 are coupled to the upper end and the lower end of the pivot plate 8 located at the back of the fuel cell 51. Hereinafter, a part of the down tube 7 from the head pipe 5 to a bent part 7c at the lower end of the body will be described as a front side 7a and a part from the bent part 7c to the pivot plate 8 will be described as a lower side 7b.

Each upper tube 6 extends further rearwardly from the pivot plate 8 toward the rear end of the body and a rear half of each upper tube 6 is used for a seat frame for supporting a seat for occupants 41. A front half of the seat 41 is used for an operator of the motorcycle 1 and a rear half is a part for a rear passenger.

The body of the motorcycle 1 is covered with a body cover 42 mainly made of a synthetic resin. The body cover 42 also functions as a windshield and a part forms the floor part 3 together with the body frame 4. A main stand 37 for supporting the body in an upright state is attached to the center of the lower part of the body frame 4 and a side stand 38 for supporting the body in a state in which the body is inclined to the left is attached to the left side of the lower part of the body frame 4.

Figure 4:
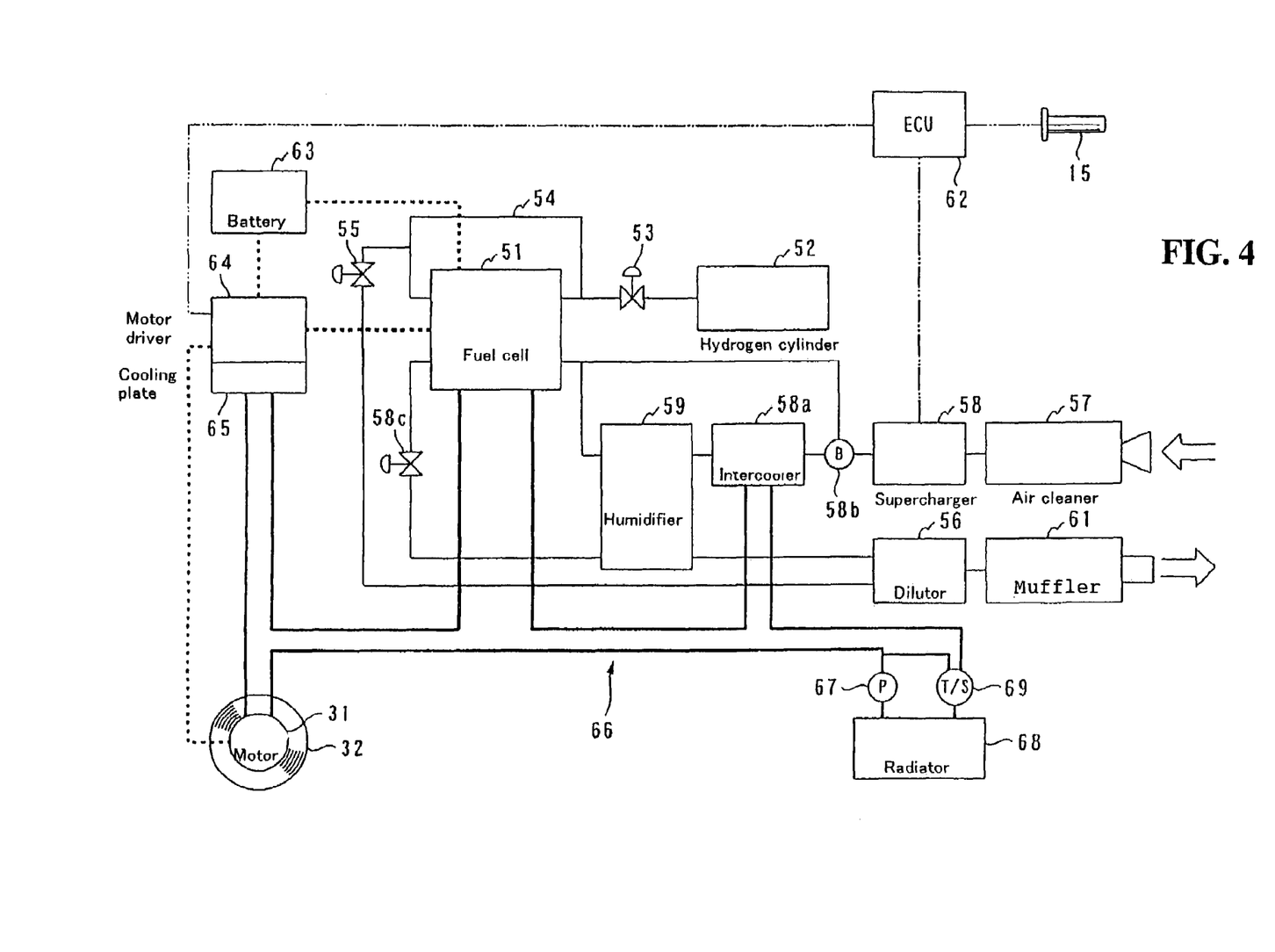
FIG. 4 is a block diagram showing a main part of a fuel cell system in the fuel cell electric vehicle.

Referring to FIG. 4, the outline of a fuel cell system of the motorcycle 1 will be described below.

The fuel cell 51 is a well-known polymer electrolyte fuel cell (PEMFC) acquired by laminating multiple battery modules (battery cells), for generating electric power by electrochemical reaction and for generating water by supplying gaseous hydrogen as fuel gas to the anode side and supplying air including oxygen as oxidizer gas to the cathode side.

Gaseous hydrogen as a fuel gas is supplied from a hydrogen cylinder 52 to the fuel cell 51 via a cut-off valve 53 under a predetermined pressure (in other words, in a predetermined high-pressure state) and after the gaseous hydrogen is used for power generation, the gaseous hydrogen is led into a hydrogen circulating passage 54. In the hydrogen circulating passage 54, unreacted gaseous hydrogen is repeatedly supplied to the fuel cell 51 together with fresh gaseous hydrogen from the hydrogen cylinder 52. Gaseous hydrogen circulated in the hydrogen circulating passage 54 can be led into a dilution box 56 via a purging valve 55.

In addition, air as oxidizer gas is supplied to the fuel cell 51 in a state that is pressurized by predetermined pressure after it is led into a supercharger 58 via an air cleaner 57 and is led into the dilution box 56 after it is used for power generation. An n inter-cooler 58a is provided for cooling air (oxidizer gas) supplied to the fuel cell 51. A humidifier 59 is provided for supplying moisture to the oxidizer gas. A bypass valve 58b is provided for supplying air without passing the inter-cooler 58a and the humidifier 59 when the fuel cell 51 is at low temperature. A back pressure valve 58c is provided for adjusting the pressure of oxidizer gas in the fuel cell 51.

When the purging valve 55 operatively connected to the hydrogen circulating passage 54 is opened, gaseous hydrogen after reaction is led into the dilution box 56. After gaseous hydrogen stored in the dilution box 56 is mixed with air emitted from the fuel cell 51 and similarly stored in the dilution box 56 and is diluted, it is emitted into the air via a muffler 61.

Water generated in the fuel cell 51 is extracted when it is led into the humidifier 59 together with emitted air and is reutilized for moisture supplied to oxidizer gas. Moisture (for example, water vapor) not extracted into the humidifier 59 is exhausted together with reacted gas via the dilution box 56 or is exhausted via a drainage pipe 81 after the moisture is condensed in the dilution box 56.

The operation of the fuel cell 51 is controlled by an electronic control unit (ECU) 62. More specifically, a signal related to the pressure and the temperature of gaseous hydrogen and oxidizer gas, a signal related to vehicle speed and the number of revolutions of the supercharger 58 and a signal related to the fuel cell 51 and the temperature of its cooling water are input to ECU 62, and the operation of the supercharger 58, the bypass valve 58b, the back pressure valve 58c, the purging valve 55 and the cut-off valve 53 is controlled according to each of these signals.

In addition, an acceleration request signal from the throttle grip 15 is input to the ECU 62 and the drive of the motor 31 for driving the rear wheel 32 that is controlled according to the signal. The motor 31 is a three-phase motor driven when direct current from the fuel cell 51 or a battery 63 as a secondary battery is supplied after the direct current is converted to three-phase alternating current in a motor driver 64 as an inverter unit.

A cooling system in the fuel cell system is formed for providing communication with a cooling channel 66 for making each channel in a water jacket of the fuel cell 51 and the motor 31 be in communication in the inter-cooler 58a and in a cooling plate (a cooler) 65 adjacent to the motor driver 64. A water pump 67 and a radiator 68 are provided to the cooling channel 66.

In such a cooling system, as cooling water is circulated in the cooling channel 66 by the operation of the water pump 67, heat is absorbed from the fuel cell 51, the motor 31, oxidizer gas and the motor driver 64 and the heat is radiated by the radiator 68. A thermostat 69 is provided for circulating cooling water without passing the radiator 68 when the fuel cell 51 is at low temperature.

To explain referring to FIGS. 1 to 3, the hydrogen cylinder 52 is a general high-pressure gas cylinder having a cylindrical appearance and is a general compound reservoir made of metal and fiber reinforced plastic. Such a hydrogen cylinder 52 is arranged above the rear wheel 32 and on the right side of the rear of the body so that the axis (the center line) C is longitudinal. In more detail, the axis C is inclined slightly downwardly in a forward direction. The hydrogen cylinder 52 at this time is arranged so that the right side end (the outside end) is located slightly outside the outside end of the upper tube 6 on the right side of the body and the left side end (the inside end) is located slightly outside the outside end of the rear wheel 32.

The front and rear ends of the hydrogen cylinder 52 are formed spherically (in other words, in a tapered state) and the hydrogen cylinder is arranged so that the front end is located in front of the pivot plate 8 and the rear end is located at the rear end of the body. A hydrogen cylinder 52, a main tap 71 of the hydrogen cylinder 52 and a hydrogen filling port 72 are arranged at the rear end thereof.

The upper tube 6 on the left side of the body is inclined rearwardly and slightly upwardly and extends substantially linearly rearwardly, while the upper tube 6 on the right side of the body extends gently downwardly in the vicinity of the pivot plate 8, compared with the upper tube 6 on the left side of the body. Each such upper tube 6 is gently directed outside in a direction of the width of the body in the vicinity of the pivot plate 8.

In addition, the upper tube 6 on the right side of the body is provided so that the lower end is substantially overlapped with the lower end of the hydrogen cylinder 52 when the body is viewed from the side, is bent upwardly at the rear end of the body, is bent downwardly after the upper tube extends towards the left side of the body to avoid the main tap 71 of the hydrogen cylinder 52 and the hydrogen filling port 72, and is coupled to the rear end of the upper tube 6 on the left side of the body.

The fuel cell 51 is wide in the direction of the width of the body and is vertically flat. In addition, a supply port and an exhaust port of oxidizer gas and gaseous hydrogen, an inlet and an outlet of cooling water are provided adjacent to the front wall.

Figure 6:
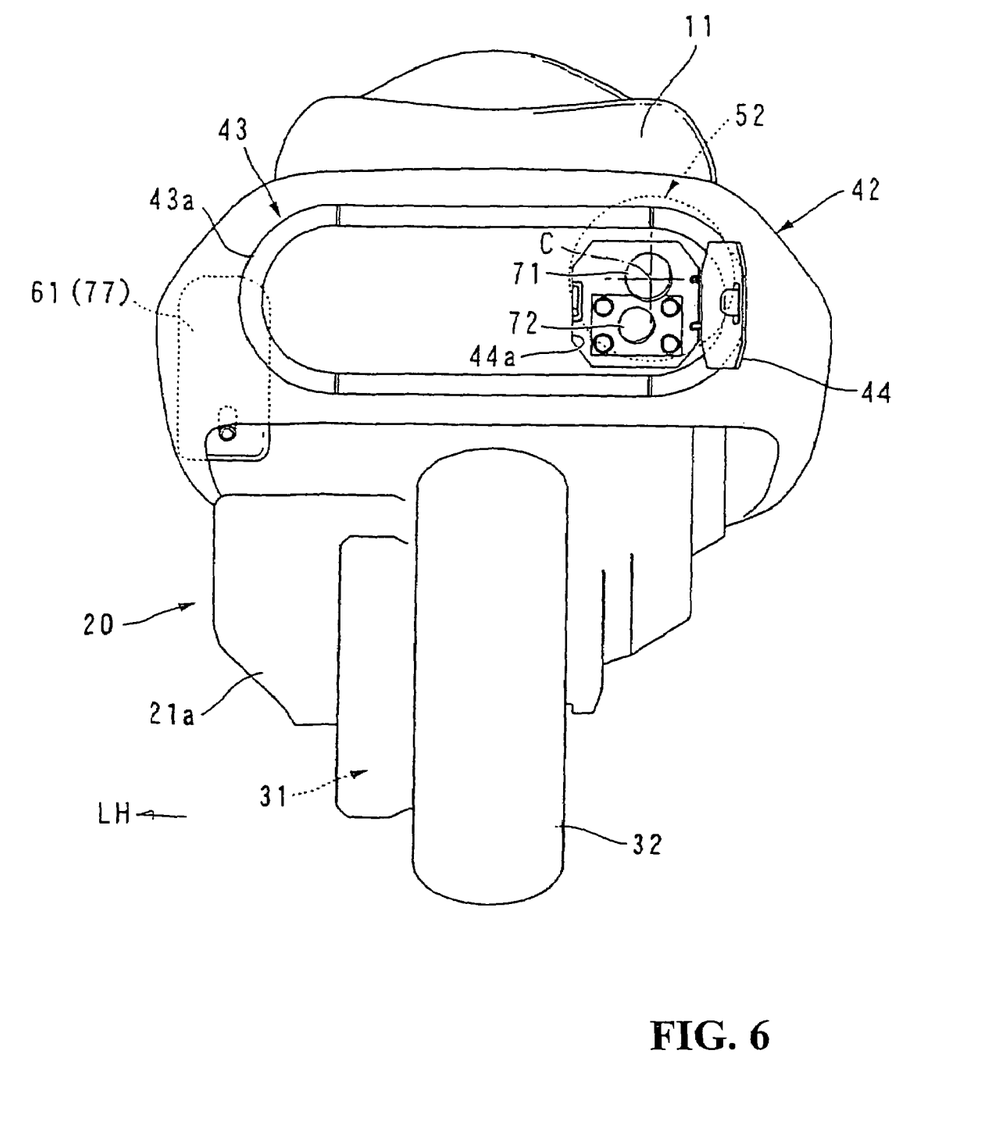
FIG. 6 is a view taken along arrow A in FIG. 1.

To explain also referring to FIGS. 6 and 7, the humidifier 59 having a body that is long in the direction of the width of the body is arranged closely on the upside and at the back of the fuel cell 51. The supercharger 58 is arranged closely on the diagonally upside and at the back of the left side of the humidifier 59 and the left side of an introduction duct 57b extends in the direction of the width of the body and is connected to the diagonally lower rear of the supercharger 58. The back pressure valve 58c is arranged closely over the left side of the humidifier 59.

The introduction duct 57b is provided so that the right side is located under the hydrogen cylinder 52 and the front end of an air cleaner case 57a located similarly under the hydrogen cylinder 52 is connected to the right side. An intake duct 73 is connected to the rear end of the air cleaner case 57a and the air cleaner 57 is configured mainly by the intake duct 73, the air cleaner case 57a and the introduction duct 57b.

The bypass valve 58b is arranged closely at the back of the right side of the humidifier 59 and the inter-cooler 58a is arranged closely at the diagonally lower back of the bypass valve 58b. The bypass valve 58b and the inter-cooler 58a are arranged so that they are located between the right side of the humidifier 59 and the right side of the introduction duct 57b in a longitudinal direction of the body. One end of a lead-through duct 58d is connected to a squirt hole located in the diagonally upper front of the supercharger 58 and the other end of the lead-through duct 58d extends rightwardly, being bent to avoid the front end of the hydrogen cylinder 52 and is connected to an inlet of the inter-cooler 58a.

The muffler 61 is flat in the direction of the width of the body and is arranged on the left side of the rear of the body so that the muffler is located outside the upper tube 6 on the left side of the body in the direction of the width of the body. The muffler 61 is substantially rectangular when it is viewed from the side of the body and is arranged in a state inclined so that the rear is located higher on the diagonally upper left side of the rear wheel 32. The muffler 61 is provided to a rear half of an exhaust pipe 77 that is inclined so that the rear is located higher. A tail pipe 75 projects rearwardly from the rear end of the muffler 61 (the exhaust pipe 77), and an exhaust port 76 of reacted gas is formed at the rear end of the tail pipe 75.

The radiator 68 is divided into a relatively small upper radiator 68a located in front of the head pipe 5 and a relatively large lower radiator 68b located in front of the front side 7a of each down tube 7. The water pump 67 is arranged at the back of the right side of the lower radiator 68b and the thermostat 69 is arranged at the back of the diagonally downside of the water pump 67. The battery 63 is flat in the direction of the width of the body and is arranged inside each body cover 42 located on both sides of the lower radiator 68b.

As shown in FIGS. 1 to 3, the dilution box 56 is arranged between the bent parts 7c of each down tube 7 so that the dilution box projects downwardly from the lower end of the lower side 7b. An exhaust short pipe 78 is led out of the dilution box 56 and is connected to the front side of the lower side 7b of the down tube 7 on the left side of the body. The exhaust pipe 77 is led from the rear side of the lower side 7b.

More specifically, the down tube 7 on the left side of the body forms a part of an exhaust path of reacted gas. Therefore, gas emitted from the dilution box 56 is exhausted into the air via the exhaust short pipe 78, the lower side 7b of the down tube 7 and the exhaust pipe 77.

Figure 5:
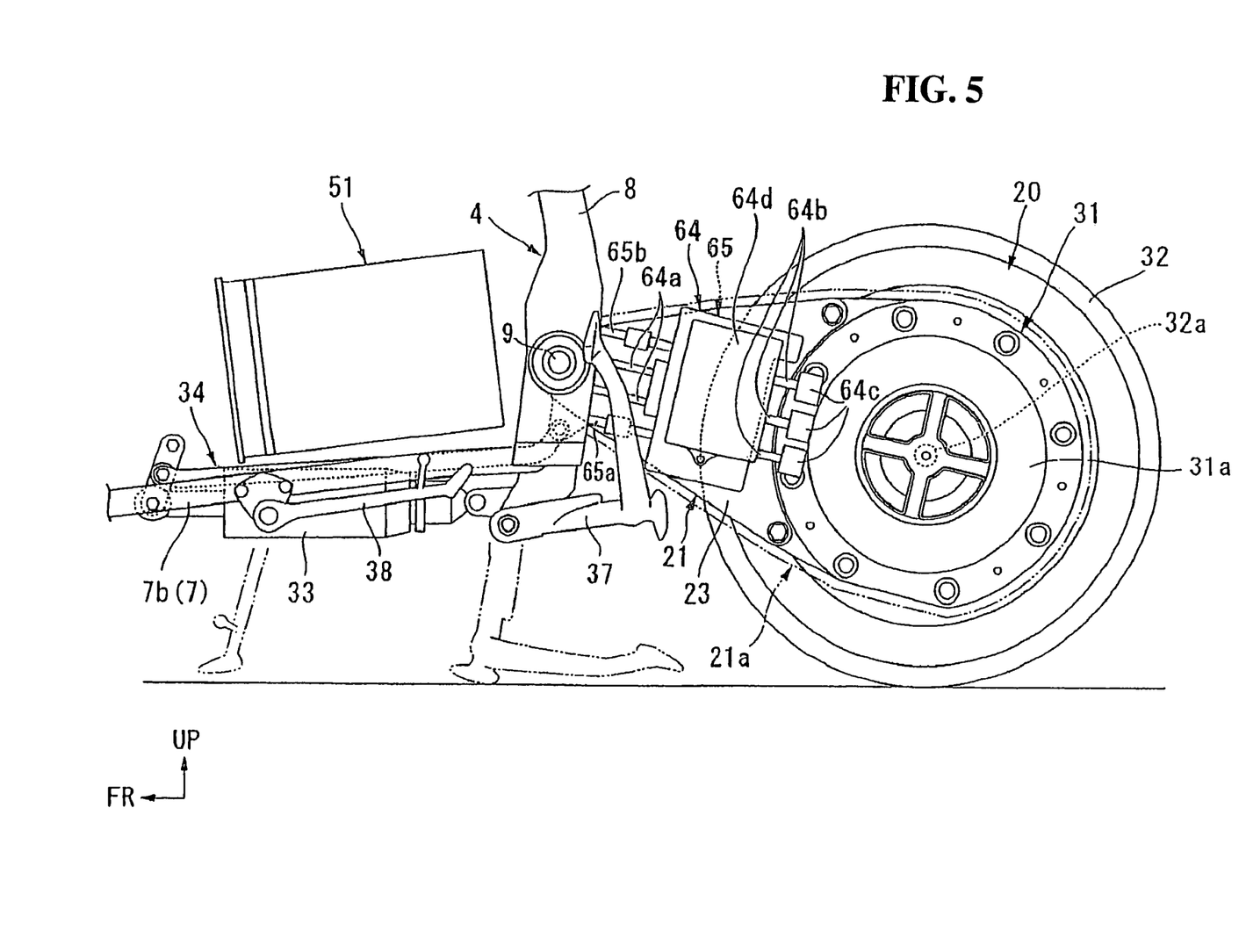
FIG. 5 is an enlarged view showing a main part in FIG. 1.

To explain also referring to FIG. 5, the motor driver 64 is substantially rectangular when the body is viewed from the side and is attached to the outside in the direction of the width of the body of the left arm body 23 of the rear swing arm 21 via the cooling plate 65. High-voltage wiring 64a for supplying electric power from the fuel cell 51 and the battery 63 is connected to the front end of the motor driver 64. A feed pipe 65a and a drainage pipe 65b which are a part of the cooling channel 66 are connected to a lower part and an upper part of the front end of the cooling plate 65.

Three-phase high-voltage wirings 64b are led out from the rear end of the motor driver 64 and each-phase high-voltage wiring 64b is connected to a feeding terminal at the front end of the motor 31 located immediately at the back of the motor driver 64. More specifically, the motor driver 64 is arranged close to the motor 31 to an extent that the motor driver is not overlapped with the motor when the body is viewed from the side. A current sensor 64c is provided for each-phase high-voltage wiring 64b for detecting an amount of current fed to the motor 31. A voltage smoothing capacitor 64d is provided as a part of the motor driver 64.

An arm cover 21a as a part of the rear swing arm 21 is mounted on the motor unit 20. The arm cover 21a covers and protects the motor driver 64, the cooling plate 65, the voltage smoothing capacitor 64d, each high-voltage wiring 64a, 64b, the feed pipe 65a, the drainage pipe 65b and the current sensor 64c together with rear swing arm 21 and the motor 31. A fresh-air inlet and a fresh-air outlet not shown are provided to the arm cover 21a so that outside air can be circulated inside the arm cover 21a.

As shown in FIGS. 1, 2 and 6, the source port 71 is positioned on the rear end of the hydrogen cylinder 52 and is installed so as to project outwardly and rearwardly on the axial line C of the hydrogen cylinder 52. Moreover, a hydrogen fill inlet 72 is installed directly below the source port 71 to project rearwardly in parallel with the source port 71. The hydrogen fill inlet 72 is positioned on the upper right side of the rear wheel 32 at the rear end of the vehicle. Moreover, the empty space on the periphery of the rear end of the hydrogen cylinder 52, that is formed to narrow towards the tip, can be effectively used for installing the hydrogen fill inlet 72 within its diameter as seen along the axis of the hydrogen cylinder 52.

The frame cover 42 covering the rear section of the vehicle covers the periphery of the hydrogen cylinder 52 to protect it. A tail lamp 43 for this motorcycle 1 is installed at the center along the vehicle width at the rear section of this type of frame cover 42.

As shown in FIG. 6, the band-shaped, light emitting surface 43a of the tail lamp 43 overlaps making a generally edgeless elliptical shape as seen from the rear of the vehicle, so that, both sides for example can form the left and right rear winkers (turn signals), and the upper section and bottom section respectively comprise the braking and rear position lamps.

An opening 44a is formed on the right side of the section enclosed by the light emitting surface 43a, on the frame cover 42 as a maintenance hole for the source port 71 and the hydrogen fill inlet 72 on the hydrogen cylinder 52. A lid 44 that opens and closes for example, by way of a hinge is installed on the opening 44a. This type of lid 44 can close to protect the source port 71 and the hydrogen fill inlet 72 that are a portion of the frame cover 42. When opened, the lid 44 exposes the source port 71 and the hydrogen fill inlet 72 to the section outside the frame cover 42 to allow filling with hydrogen gas.

The hydrogen fill inlet structure for fuel cell vehicles, for example, a motorcycle 1, of the embodiment described above, includes a hydrogen cylinder 52 for filling hydrogen gas from a hydrogen fill inlet 72, and a fuel cell 51 for generating electrical power based on hydrogen gas supplied from the hydrogen cylinder 52. A motor 31 is provided for generating propulsive power for supply to a rear wheel 32 functioning as the drive wheel based on electrical power generated in the fuel cell 51. The hydrogen fill inlet 72 is separate from the source port 71 of the hydrogen cylinder, and is also installed near the source port 71.

This structure allows for the shortening of the gas pipe installed between the hydrogen fill inlet 72 and the source port 71. Thus, the pipe layout for the hydrogen fill inlet 72 and the source port 71 can be easily performed. The operation and check of the source port 72 can easily be performed at the same time during the hydrogen gas filling and the operation of filling the hydrogen gas is easy to perform.

The hydrogen fill inlet structure, allows for the installing of the hydrogen fill inlet 72 within the diameter of the hydrogen cylinder as viewed from along its axis. Thus, the empty space on the periphery of the source port installed at the spherical rear end on the hydrogen cylinder can be effectively utilized as the space for installing the hydrogen fill inlet 72. The hydrogen fill inlet 72 can in other words, be efficiently installed. Moreover, the distance between the hydrogen fill inlet 72 and the source port 71, and therefore the length of the gas pipes installed between them (72 and 71) can be shortened even further. In other words, the pipe layout near the hydrogen fill inlet 72 is even easier.

In this hydrogen fill inlet structure, a lid 44 is installed in a section in the vicinity of the hydrogen fill inlet 72 of the frame cover 42 and the source port 71 for covering the hydrogen cylinder 52. Therefore along with protecting the hydrogen cylinder 42 with the frame cover 52, the hydrogen fill inlet 72 and the source part 71 are covered by the lid 44 during normal driving, so that the hydrogen fill inlet 72 and the source port 71 are exposed to the outside only when the lid 44 is opened during the filling of the hydrogen gas. In other words, the hydrogen gas tank 52 is better protected and the operation of filling the hydrogen gas is easier.

Also in this hydrogen fill inlet structure, the hydrogen fill inlet 72 is installed at the rear of the frame and above the rear wheel 32 so that the worker can easily access the hydrogen fill inlet 72 when filling the hydrogen gas and the filling is easier to perform since the hydrogen fill inlet 72 is installed at an appropriate height. By optimizing the layout of the hydrogen fill inlet 72 in this way, the task of filling the hydrogen gas is made even easier.

Also in this hydrogen fill inlet structure, the hydrogen fill inlet 72 is installed in the vicinity of the tail lamp 43 of the motorcycle 1 so that there is no need to design a new frame cover 42 to cope with the effects of an wind resistance when the hydrogen fill inlet 72 is for example installed on the side of the frame. Therefore, preexisting vehicle parts can be utilized so that the vehicle design is simple and the costs can be reduced.

The structure in the above embodiment is one example of this invention and of course does not limit the application of the invention to motorcycles, and needless to say, various changes can be made without departing from the spirit and scope of this invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydrogen fill inlet structure for a fuel cell vehicle comprising:
   a hydrogen cylinder for filling hydrogen gas from a hydrogen fill inlet;
   a fuel cell for generating electrical power utilizing hydrogen gas supplied from the hydrogen cylinder; and
   a motor for generating propulsive power for supply to a drive wheel based on electrical power generated from the fuel cell;
   wherein the hydrogen fill inlet is separate from a source port of the hydrogen cylinder, and is installed in the vicinity of the source port,
   wherein the hydrogen cylinder extends in a direction that is perpendicular to an axle of the drive wheel, and the hydrogen fill inlet and the source port project in a direction rearwardly and away from a rear end of the hydrogen cylinder.

2. The hydrogen fill inlet structure for a fuel cell vehicle according to claim 1, wherein the hydrogen fill inlet structure is installed within the diameter of the hydrogen cylinder as viewed axially along the hydrogen cylinder.

3. The hydrogen fill inlet structure for a fuel cell vehicle according to claim 2, and further including a cover member for covering the hydrogen cylinder, wherein a lid is installed on a section in proximity to the source port and the hydrogen fill inlet of the cover member.

4. The hydrogen fill inlet structure for a fuel cell vehicle according to claim 2, wherein the hydrogen fill inlet is installed in the vicinity of a vehicle tail lamp, the tail lamp having a band-shaped, light emitting surface, and the hydrogen fill inlet is accessible inside a perimeter of the band-shaped, light emitting surface.

5. The hydrogen fill inlet structure for a fuel cell vehicle according to claim 1, and further including a cover member for covering the hydrogen cylinder which is disposed on one side of the drive wheel and a muffler which is disposed on the opposite side of the drive wheel, wherein a lid is installed on a section of the cover member in proximity to the source port and the hydrogen fill inlet of the cover member.

6. The hydrogen fill inlet structure for a fuel cell vehicle according to claim 5, wherein the hydrogen fill inlet is installed on a rear end of the frame and above the drive wheel.

7. The hydrogen fill inlet structure for a fuel cell vehicle according to claim 1, wherein the hydrogen fill inlet is installed on a rear end of a frame and above the drive wheel.

8. The hydrogen fill inlet structure for a fuel cell vehicle according to claim 1, wherein the source port extends along a longitudinal axis C of the hydrogen cylinder.

9. The hydrogen fill inlet structure for a fuel cell vehicle according to claim 1, wherein the hydrogen fill inlet is installed in the vicinity of a vehicle tail lamp, the tail lamp having a band-shaped, light emitting surface, and the hydrogen fill inlet is accessible inside a perimeter of the band-shaped, light emitting surface.

10. The hydrogen fill inlet structure for a fuel cell vehicle according to claim 1, wherein the hydrogen fill inlet is installed in the vicinity of a vehicle tail lamp, the tail lamp having a band-shaped, light emitting surface, and the source port is accessible inside a perimeter of the band-shaped, light emitting surface.

11. The hydrogen fill inlet structure for a fuel cell vehicle according to claim 1, wherein the source port extends along a longitudinal centerline of the hydrogen cylinder.

12. A hydrogen fill inlet structure for a fuel cell vehicle comprising:
    a hydrogen cylinder for filling hydrogen gas from a hydrogen fill inlet;
    a fuel cell for generating electrical power utilizing hydrogen gas supplied from the hydrogen cylinder; and
    a motor for generating propulsive power for supply to a drive wheel based on electrical power generated from the fuel cell;
    wherein the hydrogen fill inlet is separate from a source port of the hydrogen cylinder, and is installed in the vicinity of the source port,
    wherein the hydrogen fill inlet is installed in the vicinity of a vehicle tail lamp mounted on a cover member, the tail lamp having a band-shaped, light emitting surface, and the source port is accessible by opening a lid of the cover member located inside a perimeter of the band-shaped, light emitting surface.

13. A hydrogen fill inlet structure for a fuel cell vehicle comprising:
    a hydrogen cylinder for filling hydrogen gas; and
    a hydrogen fill inlet for filling the hydrogen cylinder;
    wherein the hydrogen fill inlet is separate from a source port of the hydrogen cylinder, and is installed in the vicinity of the source port,
    wherein the hydrogen cylinder extends in a direction that is perpendicular to an axle of the drive wheel, and the hydrogen fill inlet and the source port project in a direction rearwardly and away from a rear end of the hydrogen cylinder.

14. The hydrogen fill inlet structure for a fuel cell vehicle according to claim 13, wherein the hydrogen fill inlet structure is installed within the diameter of the hydrogen cylinder as viewed axially along the hydrogen cylinder.

15. The hydrogen fill inlet structure for a fuel cell vehicle according to claim 14, and further including a cover member for covering the hydrogen cylinder, wherein a lid is installed on a section in proximity to the source port and the hydrogen fill inlet of the cover member.

16. The hydrogen fill inlet structure for a fuel cell vehicle according to claim 13, and further including a cover member for covering the hydrogen cylinder which is disposed on one side of the drive wheel and a muffler which is disposed on the opposite side of the drive wheel, wherein a lid is installed on a section of the cover member in proximity to the source port and the hydrogen fill inlet of the cover member.

17. The hydrogen fill inlet structure for a fuel cell vehicle according to claim 16, wherein the hydrogen fill inlet is installed on a rear end of the frame and above a rear wheel.

18. The hydrogen fill inlet structure for a fuel cell vehicle according to claim 13, wherein the hydrogen fill inlet is installed on a rear end of the frame and above a rear wheel.

19. The hydrogen fill inlet structure for a fuel cell vehicle according to claim 13, wherein the hydrogen fill inlet is installed in the vicinity of a vehicle tail lamp, the tail lamp having a band-shaped, light emitting surface, and the hydrogen fill inlet is accessible inside a perimeter of the band-shaped, light emitting surface.

20. The hydrogen fill inlet structure for a fuel cell vehicle according to claim 13, wherein the hydrogen fill inlet is installed in the vicinity of a vehicle tail lamp mounted on a cover member, the tail lamp having a band-shaped, light emitting surface, and the source port is accessible by opening a lid of the cover member located inside a perimeter of the band-shaped, light emitting surface.

* * * * *